United States Patent
Qi et al.

(10) Patent No.: US 7,421,710 B2
(45) Date of Patent: Sep. 2, 2008

(54) SYSTEM AND METHOD OF CREATING VIRTUAL DATA PATHS USING A MULTIPLE-PATH DRIVER

(75) Inventors: Yanling Qi, Austin, TX (US); Eric Stanton, Derby, KS (US)

(73) Assignee: LSI Corporation, Milpitas, CA (US)

( * ) Notice: Subject to any disclaimer, the term of this patent is extended or adjusted under 35 U.S.C. 154(b) by 707 days.

(21) Appl. No.: 10/682,149

(22) Filed: Oct. 8, 2003

(65) Prior Publication Data

US 2005/0091441 A1 Apr. 28, 2005

(51) Int. Cl.
*G06F 9/54* (2006.01)
*G06F 13/42* (2006.01)

(52) U.S. Cl. .......................................... 719/321; 710/38
(58) Field of Classification Search .................. 719/321; 710/38
See application file for complete search history.

(56) References Cited

U.S. PATENT DOCUMENTS

| | | | |
|---|---|---|---|
| 5,412,798 A | 5/1995 | Garney | |
| 5,732,282 A | 3/1998 | Provino et al. | |
| 5,815,707 A * | 9/1998 | Krause et al. | 719/321 |
| 6,009,476 A | 12/1999 | Flory et al. | |
| 6,145,028 A * | 11/2000 | Shank et al. | 710/31 |
| 6,173,374 B1 | 1/2001 | Heil | |
| 6,233,624 B1 | 5/2001 | Hyder et al. | |
| 6,341,356 B1 | 1/2002 | Johnson et al. | |
| 6,470,397 B1 | 10/2002 | Shah et al. | |
| 6,625,747 B1 | 9/2003 | Tawil et al. | |
| 6,704,812 B2 | 3/2004 | Bakke et al. | |
| 6,809,735 B1 * | 10/2004 | Stauffer et al. | 345/522 |
| 2002/0023151 A1 * | 2/2002 | Iwatani | 709/223 |
| 2002/0143842 A1 * | 10/2002 | Cota-Robles et al. | 709/1 |
| 2004/0064827 A1 * | 4/2004 | Cox | 719/321 |
| 2004/0107300 A1 * | 6/2004 | Padmanabhan et al. | 710/1 |
| 2004/0172636 A1 * | 9/2004 | Do et al. | 719/321 |
| 2004/0225764 A1 * | 11/2004 | Pooni et al. | 710/38 |
| 2005/0021878 A1 * | 1/2005 | Iwatani et al. | 710/1 |

* cited by examiner

*Primary Examiner*—Meng-Ai An
*Assistant Examiner*—Abdou K Seye
(74) *Attorney, Agent, or Firm*—Cochran Freund & Young LLC

(57) ABSTRACT

Disclosed is a system and method for transmitting computer data within a single computer system along more than one physical data path by providing a multiple-path driver that creates virtual (or non-physical) data paths without modifying the source code of the operating system. The system and method may be used with any computer hardware regardless of manufacturer. In one embodiment, a multiple-path driver may be used within a Linux operating system to create virtual data paths and transmit data between the upper-level drivers of the Linux system and at least one computer data storage device without modifying the Linux source code.

10 Claims, 4 Drawing Sheets

SYSTEM AND METHOD OF CREATING VIRTUAL DATA PATHS USING A MULTIPLE-PATH DRIVER

BACKGROUND OF THE INVENTION a. Field of the Invention

The present invention pertains generally to controllers of computer data storage systems and more particularly to software-based controllers of computer data storage systems.

b. Description of the Background

Computer systems handling large quantities of data have storage devices that can hold such large quantities of data and allow that data to be quickly retrieved, changed or manipulated. When using a computer system in situations where loss or unavailability of stored data is unacceptable, a computer system may contain host bus adapters to eliminate single-point failures. The host bus adapters in these cases are connected to data storage devices.

A computer system has a finite number of pieces of hardware and a finite number of physical paths between a host computer and a set of storage devices. Previously, computer users have tried to maximize data storage throughput by allowing the physical data paths to be shared among several storage devices, preferably so that each storage device only uses one data path at a time. Computer systems use a device "driver," or specialized set of software commands, to direct the operations of each device.

Multiple-path (or multipath) drivers have attempted to improve upon these previous techniques. Multipath drivers direct data flow within the data paths of a computer system so that data input and output (or I/O) operations can continue despite the failure or degradation of a data path. If any part of a data path, whether hardware or software, breaks down, data can be re-routed to an alternate path without crippling the entire system, while the primary path is repaired. However, incorporating multiple-path drivers into a computer system without impacting the performance and integrity of the operating system within the computer system is difficult, particularly when the operating system and I/O must remain unaffected.

Attempts have been made to use virtual data paths within a computer system with the aid of a logical volume manager. The imperfect results of these methods have resulted in modifications by designers of such systems of the host operating system source code. However, modifying host operating system source code is undesirable for several reasons. First, host operating system source code modifications may create unforeseen negative effects in other areas of a computer system, even in those areas seemingly unaffected by the modified code. Second, users of some operating systems require that any modifications to their operating system's source code be made available at no additional cost and that any negative effects of modified code be fixed at the expense of the modifier. This reduces the economic benefit to anyone who modifies source code, not only because improvements cannot be sold, but also because time and money may be required to create no-cost "patches" for any problems caused by these improvements.

It would therefore be advantageous to provide a software program that allows a computer system to use more than one data path, increase throughput and minimize the effect of failed data paths. It would also be advantageous if such a software program could be used with various hardware systems regardless of manufacturer. It would further be advantageous if such a software program could be implemented on any computer system without modifying the source code of the operating system within the computer system.

SUMMARY OF THE INVENTION

The disclosed embodiments overcome the disadvantages and limitations of the prior art by providing a multiple-path driver that transmits data along multiple physical paths between a host computer and a set of computer data storage devices. The multiple-path driver creates virtual (or non-physical) data paths within a single computer system without modifying the source code of the operating system to provide increased throughput and minimize the effect of failed data paths. The system and method may be used with any computer hardware regardless of manufacturer. In one embodiment, a multiple-path driver may be used within a Linux operating system to create virtual data paths and transmit data between the upper-level drivers of the Linux system and at least one computer data storage device without modifying the Linux source code.

An embodiment may therefore comprise a method of transmitting computer data between a host computer and at least one computer data storage device by inserting a multiple-path driver between driver-stack levels of an operating system operating on the host computer comprising: selectively redirecting device commands from upper-level drivers of the operating system of the host computer to the multiple-path driver; creating a virtual path between the multiple-path driver and the computer data storage devices; selectively directing device commands from the multiple-path driver to a virtual host bus adapter driver within the multiple-path driver along the virtual path; transmitting computer data along more than one physical path between the multiple-path driver and the computer data storage devices; and, selectively presenting the computer data storage devices to the upper-level drivers of the operating system of the host computer as a single virtual computer data storage device.

An embodiment may further comprise a system that transmits computer data along more than one physical data path between a host computer and at least one computer data storage device comprising: a computer operating system that contains a driver stack that transmits commands from the host computer through the operating system to computer data storage devices; at least one host bus adapter that connects the computer operating system to the computer data storage devices; at least one host bus adapter driver that directs the host bus adapters; a multiple-path driver that transmits data along multiple physical paths between the host computer and the computer data storage devices by diverting device commands from the computer operating system to a virtual host bus adapter driver; at least one controller that directs the computer data storage devices to acquire or transmit data; at least one cable that connects the host bus adapters to the controllers of the computer data storage devices; and, a set of buses that connect the controllers to the computer data storage devices and allow the computer data storage devices to acquire or transmit data.

The advantages of the present invention are that multiple physical data paths may be used to maximize data throughput within a computer system and are made available in case of system malfunction. Further, the multiple-path driver operates with various types of computer hardware and multiple storage devices can be added to a system without impacting the performance of the operating system within the computer system. In addition, the multiple-path driver may be used without modifying the operating system source code.

DETAILED DESCRIPTION OF THE INVENTION

Figure 1:
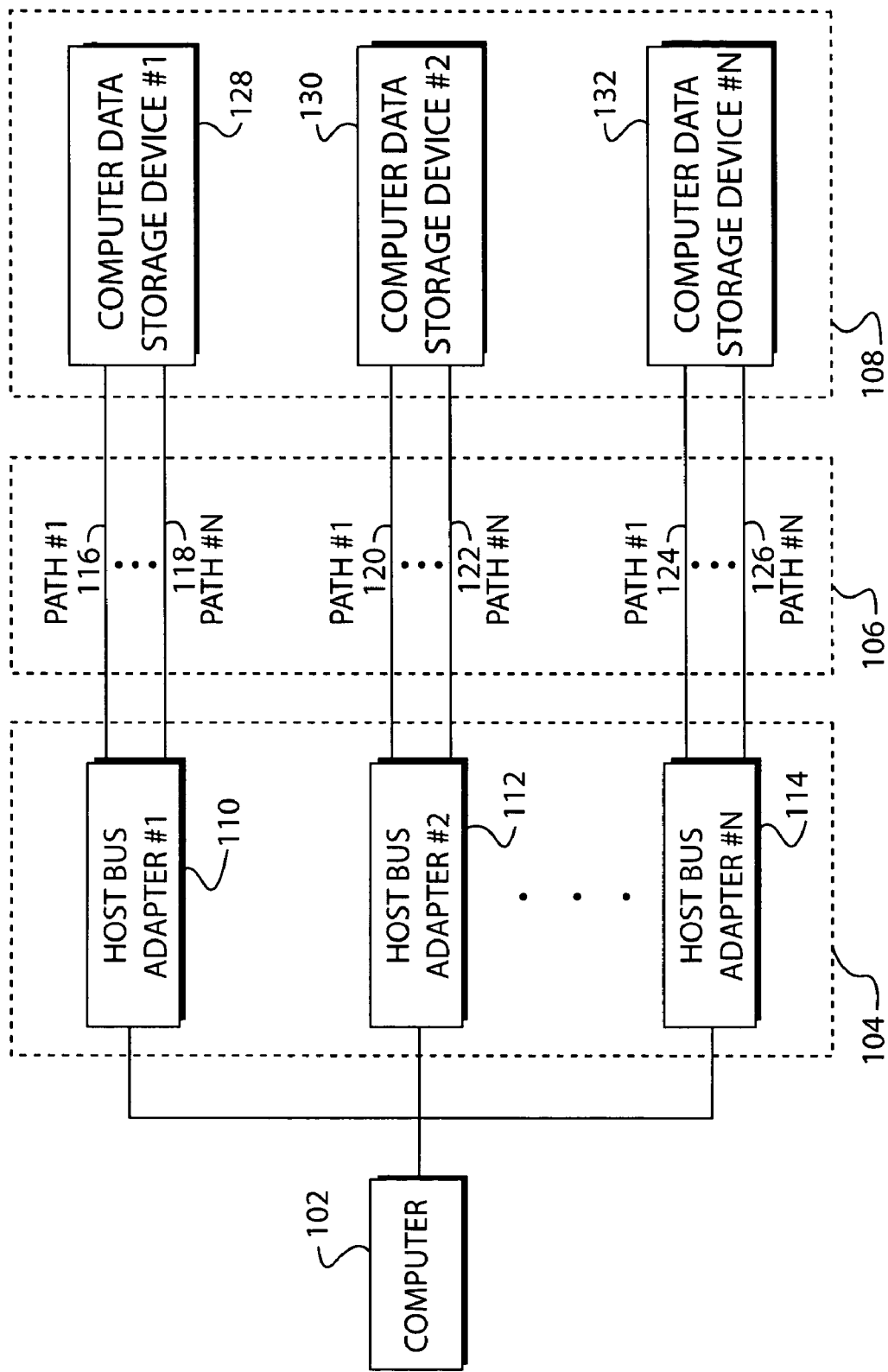
FIG. 1 is a schematic representation of the physical connections of various elements of a typical embodiment of the present method.

FIG. 1 illustrates a schematic representation of one embodiment illustrating the physical connections of the various elements of creating virtual data storage devices using a multiple-path driver. One common method of maximizing data storage is by use of a "host bus adapter," a piece of computer hardware that contains its own device drivers. Host bus adapters can generally be used only with a single manufacturer's equipment, and only for the exact units of equipment purchased. If more storage devices are needed, a different or additional host bus adapter may be required. If a computer user desires to upgrade storage devices, or if storage devices are damaged in any way, the host bus adapter may become inoperable and cripple the entire computer system.

As shown in FIG. 1, a computer 102 is physically connected to a set of N host bus adapters 104, where N is usually a power of two (2, 4, 8, 16, etc.). This set of N host bus adapters 104 is typically located on a single hardware card. Each individual host bus adapter 110-114 is connected by at least one in a set of N paths 106 to a corresponding computer data storage device 128-132 within a set of N computer data storage devices 108. Individual paths 116-126 within the set of paths 106 are computer cables that physically connect a single host bus adapter within the set of N host bus adapters 104 to a computer data storage device 128-132 within the set of N computer data storage devices 108. This set of N computer data storage devices 108 is typically a set of hard disks or a RAID array. Once the necessary physical connections in FIG. 1 have been made to connect one side of the set of N host bus adapters 104 to the computer 102 and the other side of the set of N host bus adapters 104 to the set of computer data storage devices 108 through the paths 106, the operating system is activated within the computer system and the driver stack may become operational, leading to the data flow detailed in FIG. 2.

Figure 2:
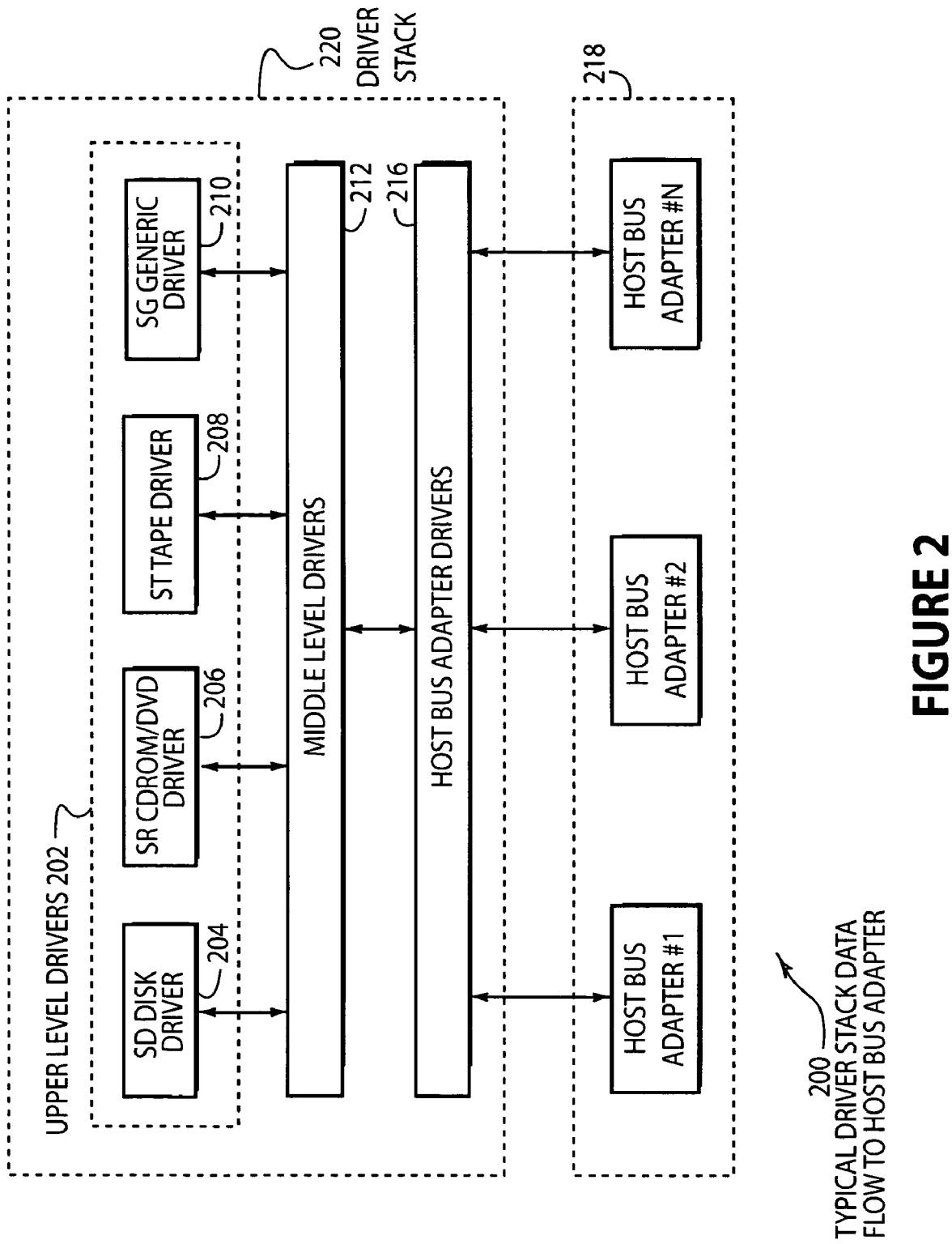
FIG. 2 is a schematic representation of the data flow between a driver stack in the Linux operating system and a host bus adapter.

FIG. 2 is a schematic representation 200 of data flow between a driver stack in a computer operating system and a host bus adapter. A common operating system, such as Linux, has three levels of drivers within its driver stack 220, generally called "upper-level" drivers 202, "middle-level" drivers 212 and host bus adapter drivers 216. The upper-level drivers 202 provide interfaces to a host computer, convert host computer requests into Small Computer System Interface (SCSI) commands, and typically contain drivers 204-210. The middle-level drivers 212 receive SCSI commands from the upper-level drivers 202 and dispatch commands to the host bus adapter drivers 216.

Each of the upper-level drivers 202 typically contains computer code that commands a different common hardware item. Common hardware devices driven by such upper-level drivers 202 include the disk driver (commonly abbreviated as "SD" by Linux programmers) 204, the CDROM/DVD driver ("SR") 206 and the tape driver ("ST") 208. A generic driver ("SG") 210 may drive all hardware devices in the computer system as necessary, including those hardware devices that have their own device drivers.

The upper-level drivers 202, as a set, command the middle-level drivers 212, which in turn command the host bus adapter drivers 216. The host bus adapter drivers 216 may direct the set of N host bus adapters 218.

After the operating system is functional within a computer system, the multiple-path driver may be loaded into the computer system so as not to affect the operating system. This multiple-path driver may contain software that has two sets of functions. One set of functions interfaces with the upper-level drivers 202, and the other set of functions interfaces with the host bus adapter drivers 216. Additional discussions regarding multiple-path drivers are detailed in a co-assigned U.S. patent application "METHOD AND APPARATUS FOR PROVIDING HIGHLY-TRANSPARENT, HOST-BASED MULTI-PATHING SUPPORT," Ser. No. 09/960,827, filed Sep. 21, 2001, which is specifically incorporated herein by reference for all that it discloses and teaches.

Figure 3:
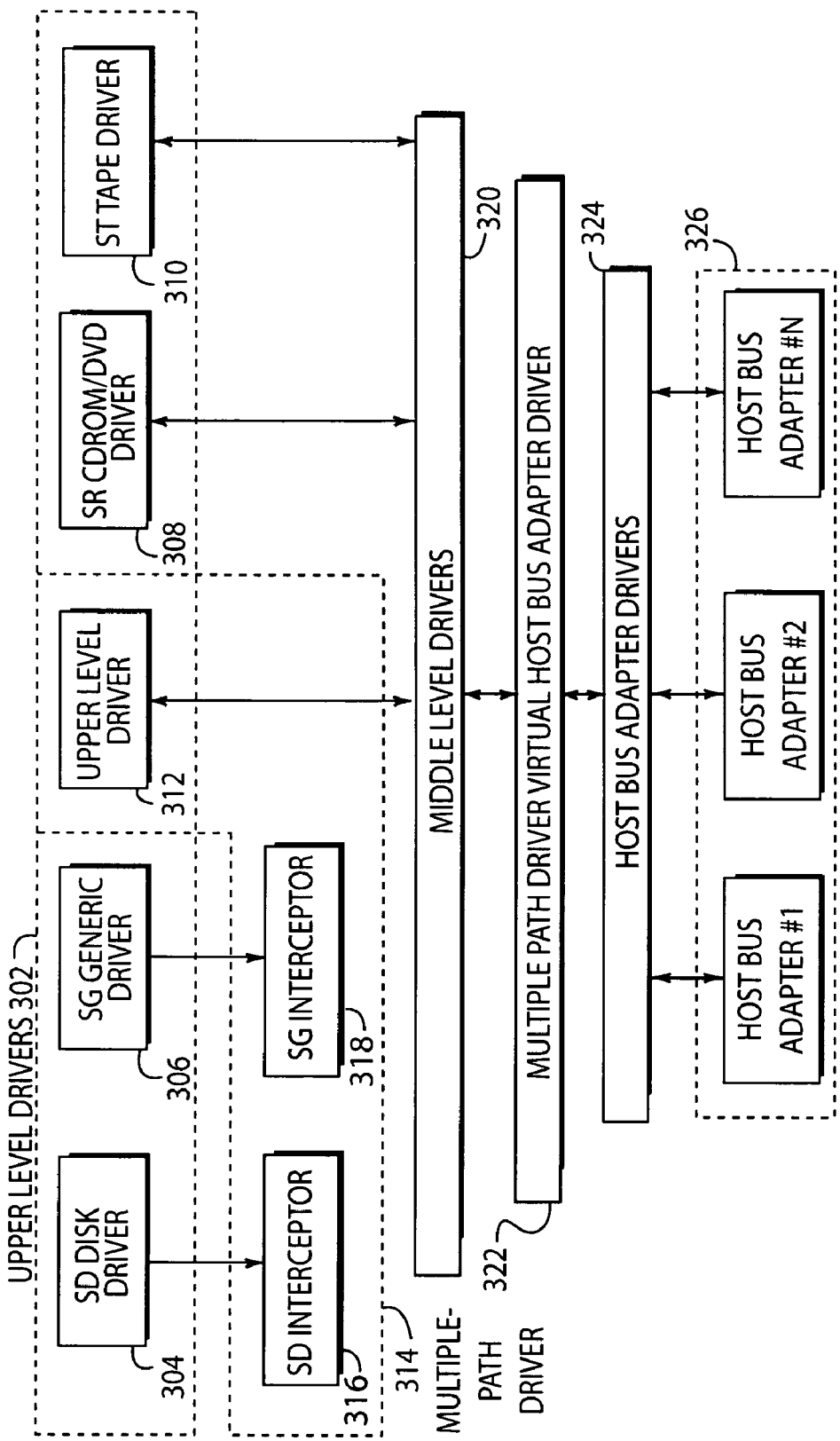
FIG. 3 is a schematic representation of the method of inserting a multiple-path driver into the combination of a Linux operating system driver stack and a host bus adapter.

FIG. 3 is a schematic representation 300 of the method of inserting a multiple-path driver into the combination of a driver stack and a host bus adapter, such as might be used in a Linux operating system. The upper-level drivers 302 may include, in addition to a disk driver (SD) 304, a generic driver (SG) 306, a CDROM/DVD driver (SR) 308 and a tape driver (ST) 310, an upper-level driver 312 that is part of the multiple-path driver 314.

The multiple-path driver 314 may include software that intercepts the device-claiming interfaces of the SD driver 316 and SG driver 318, whether initiated by the upper-level drivers 302 or the middle-level drivers 320. The interception makes a physical path "invisible" to the SD/SG drivers 3xx and 3xx so that no I/O from an application can go to the physical paths directly. This interceptor software may locate the commands directing SD and SG within the operating system upper level driver list "SCSI_devicelist" and save the operating system SD and SG function pointers. The interceptor software may then replace references to the SD and SG function pointers within the operating system with references to the multiple-path driver.

When a computer system is made operational, the middle-level drivers 320 may receive information from the multiple-path driver virtual host bus adapter driver 322 and host bus adapter drivers 324 about what devices are available. The middle-level drivers 320 may then request the upper-level drivers 302 to make all devices operational that are contained in the computer system. When the middle-level drivers 320 send commands to make the SD disk driver 304 or the SG generic driver 306 operational, the commands may be intercepted by the SD interceptor software 316 or the SG interceptor software 318, respectively, included within the multiple-path driver 314.

The result of replacing the SD and SG device driver references with references to the multiple-path driver is that the operating system will now only see the multiple-path driver's creation of a single virtual (non-physical) data storage device, no matter how many different physical paths to the data storage devices are available. Since a computer system works best when seeing one data storage device, the operating system may continue optimum performance no matter how many physical paths to data storage devices are added to the computer system. When one physical path fails, applications may still access data from other paths.

The middle-level drivers 320 may command the host bus adapter drivers 324. The host bus adapter drivers 324 may now interface with a virtual host bus adapter driver 322 that is part of the multiple-path driver. A virtual host bus adapter driver 322 may interface with and command not only the host bus adapter drivers 324, but also a set of N host bus adapters 326.

Figure 4:
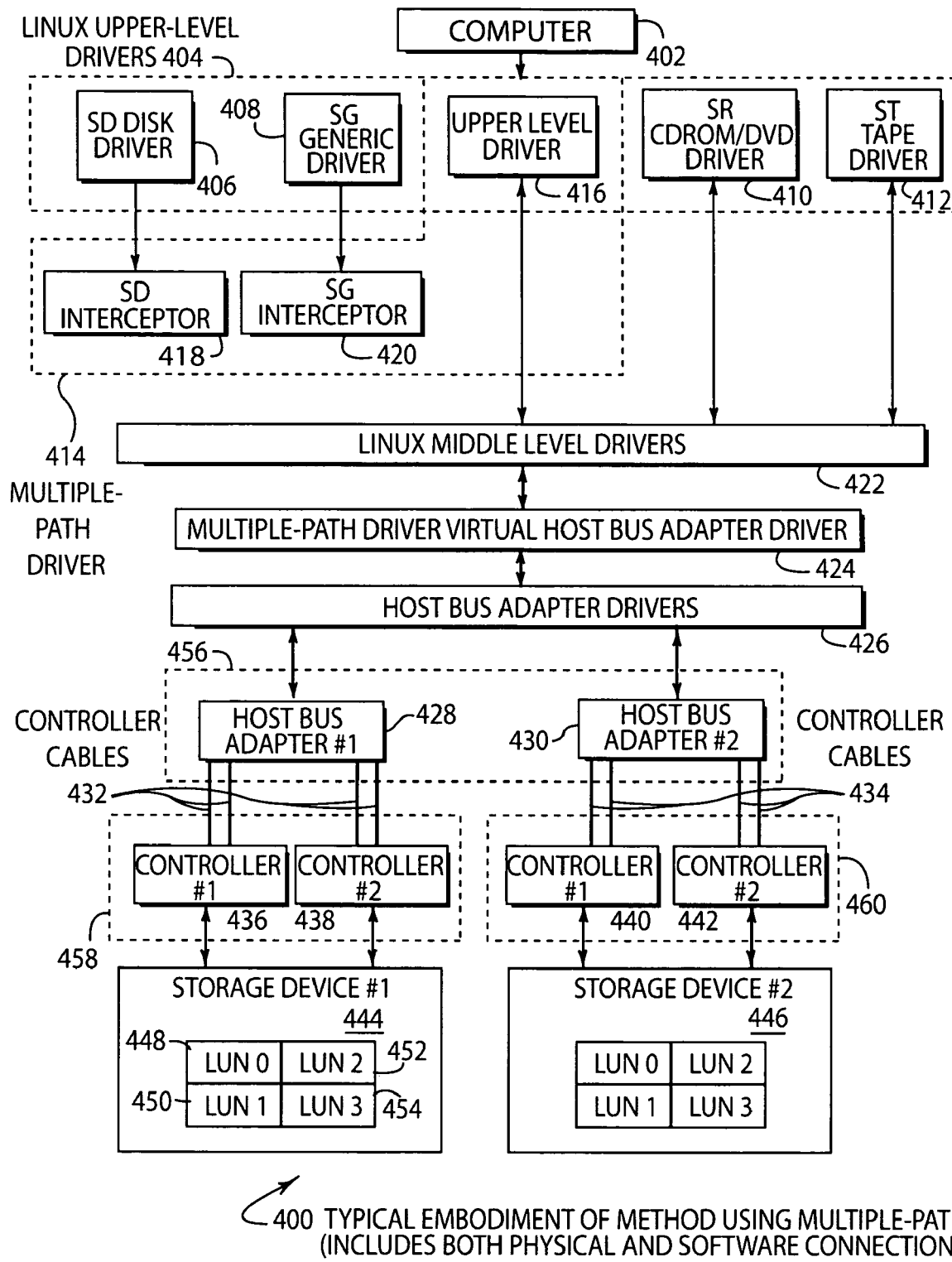
FIG. 4 is a schematic representation of a typical embodiment of the present method of data flow (including both physical connections and software connections) between a computer and a set of computer data storage devices using a multiple-path driver.

FIG. 4 is a schematic representation 400 of a typical embodiment of the present method that illustrates the data flow of an entire computer data storage system after a multiple-path driver has been inserted. A computer 402 is connected to the Linux upper-level drivers 404 that may include a disk driver 406 (SD), a generic driver 408 (SG), a CDROM/DVD driver 410 (SR), a tape driver 412 (ST), and an upper-level driver 416 that is part of a multiple-path driver 414. The multiple-path driver may include an SD interceptor 418 and SG interceptor 420. Upper-level drivers may interface with middle-level drivers 422, which may in turn command host bus adapter drivers 426.

The middle-level drivers 422 may interface with a virtual host bus adapter driver 424 that is part of the multiple-path driver 414. The virtual host bus adapter driver 424 may in turn command the host bus adapter drivers 426. The host bus adapter drivers 426 may be connected to and command a set of two host bus adapters 456. Each host bus adapter 428 and 430 may transmit commands through its set of two connector cables 432 and 434, respectively, to drive software for a set of two controllers 458 and 460 that may be connected to a single computer data storage device 444 or 446.

Each computer storage device may be typically divided into more than one "logical unit," or LUN. A logical unit is not a physical division within a computer device, but a virtual division within the memory of a data storage device. For example, a data storage device that holds 128 megabytes of memory may be divided into four logical units that each contain 32 megabytes of memory. Each logical unit may be considered a separate data storage device by an operating system during its typical process of device interrogation.

As shown in FIG. 4, a computer data storage device 444 or 446 may be divided into four logical units 448-454, numbered LUN 0, LUN 1, LUN 2 and LUN 3 by the software in the controllers 458 and 460. Controller #1 436 or 440 may direct data in LUN 0 and LUN 1 of each storage device 444 or 446, while controller #2 438 or 442 may direct data in LUN 2 and LUN 3 in a similar manner.

When computer 402 sends a request to access data in a storage device 444 or 446, the request goes to the SD driver 406 or SG driver 408. When the SD driver 406 or SG driver 408 sends the request to the Linux middle-level drivers 422, the request is redirected to the virtual host bus adapter driver 424. When the Linux middle-level drivers 422 receive the request from the SD driver 406 or SG driver 408, the request will go to the host bus adapter drivers 426 through the virtual host bus adapter driver 424 that is part of the multiple-path driver 414. The computer system sees the virtual host bus adapter driver 424 as the only available data storage device.

The host bus adapter drivers 426 access data in the desired LUN 448-454 through the host bus adapters 456, the controller cables 432 and 434, the controllers 458 and 460, and individual storage devices 444 and 446. Although more than one physical path is available between the host bus adapter drivers 426 and the desired LUN 448-454, the computer system sees only the virtual host bus adapter driver 424. Without the multiple-path driver 414 in use, the computer system would see each individual LUN more than once and consider each physical data path as a separate SCSI device. Since a computer system works best when seeing a single data storage device, the operating system runs at peak efficiency without the complications created by seeing each individual LUN more than once.

The described embodiment therefore provides a method of using a multiple-path driver to utilize multiple physical data paths within a computer system to maximize data throughput and to make multiple data paths available in case of system malfunction. The multiple-path driver also allows an unlimited number of storage devices to be attached to the computer system without impairing the performance of the operating system within the computer system. The function of the multiple-path driver is independent of hardware manufacturer. The multiple-path driver may be used without the time and expense of modifying the operating system source code.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of transmitting computer data between a host computer and at least one computer data storage device where there are multiple physical communications paths between said host computer and said at least one computer data storage device comprising:

inserting a multiple-path driver between driver-stack levels of an operating system operating on said host computer without affecting said operating system operation, said multiple-path driver further being provided without modifying said operating system source code;

inserting a part of said multiple-path driver between middle-level device drivers of said operating system of said host computer and host bus adapter drivers of said operating system of said host computer;

inserting an additional part of said multiple-path driver into said upper-level device drivers of said operating system of said host computer to interface with said middle-level device drivers of said operating system of said host computer; selectively intercepting device commands from upper-level drivers of said operating system of said host computer;

replacing commands of the upper-level drivers and references to the upper-level function pointers within the operating system with commands and references to the multiple-path driver;

creating a virtual data path between said multiple-path driver and said computer data storage devices;

selectively directing device commands from said multiple-path driver to a virtual host bus adapter driver within said multiple-path driver along said virtual path; transmitting computer data along more than one physical path of said multiple physical communications paths between said multiple-path driver and said computer data storage devices; and selectively presenting said computer data storage devices to said upper-level drivers of said operating system of said host computer as a single virtual computer data storage device.

2. A method of claim 1 further comprising the step of:
utilizing at least one array of computer hard disks as said computer data storage devices.

3. A system that transmits computer data along more than one physical data path between a host computer and at least one computer data storage device comprising:
a computer operating system that contains a driver stack that transmits commands from said host computer through said operating system to said computer data storage devices;
at least one host bus adapter that connects said computer operating system to said computer data storage devices;
at least one host bus adapter driver that directs said host bus adapters;
a multiple-path driver that transmits data along multiple physical paths between said host computer and said computer data storage devices by intercepting device commands from said computer operating system, replacing commands of said multiple-path driver and sending said commands of said multiple-path driver to a virtual host bus adapter driver such that said computer data storage devices are selectively presented to said computer operating system of said host computer as a single virtual computer storage device, said multiplepath driver functioning without affecting said computer operating system operation, said multiple-path driver being provided without modifying said computer operating system source code, a portion of said multiple-path driver being inserted between middle-level device drivers of said computer operating system of said computer and said host bus adapter drivers of said computer operating system of said host computer, an additional portion of said multiple-path driver being inserted into said upper-level device drivers of said computer operating system of said host computer to interface with said middle-level device drivers of said computer operating system of said host computer;
selectively presenting said computer data storage devices to said upper-level drivers of said operating system of said host computer as a single virtual computer data storage device
at least one controller that directs said computer data storage devices to acquire or transmit data;
at least one cable that connects said host bus adapters to said controllers of said computer data storage devices; and
a set of buses that connect said controllers to said computer data storage devices and allow said computer data storage devices to acquire or transmit data.

4. The system of claim 3 wherein said computer data storage devices are comprised of arrays of computer hard disks.

5. The system of claim 3 wherein said set of cables that connect said host bus adapters to said controllers of said computer data storage devices is electrical.

6. The system of claim 3 wherein said set of cables that connect said host bus adapters to said controllers of said computer data storage devices is fiber-channel.

7. A system that transmits computer data along more than one physical data path between a host computer and computer data storage devices comprising:
a computer operating system that contains a driver stack having three levels of drivers within its driver stack, generally comprising upper-level drivers, middle-level drivers, and host bus adapter drivers that transmits commands from said host computer through said operating system to said computer data storage devices;
a set of host bus adapters that connects said computer operating system to said computer data storage devices comprised of arrays of computer hard disks;
a set of host bus adapter drivers that directs said host bus adapters;
a multiple-path driver that utilizes multiple paths for data flow between said host computer and said computer data storage devices by intercepting device commands from said computer operating system, replacing commands of said computer operating system with commands of said multiple-path driver and sending said commands of said multiple-path driver to a virtual host bus adapter such that said computer data storage devices are selectively presented to said computer operating system of said host computer as a single virtual computer storage device, said multiple-path driver functioning without affecting said computer operating system operation and said multiple-path driver being provided without modifying said computer operating system source code;
a portion of said multiple-path driver that is inserted between said middle-level device drivers of said computer operating system of said computer and said host bus adapter drivers of said computer operating system of said host computer;
an additional portion of said multiple-path driver that is inserted into said upper-level device drivers of said computer operating system of said computer to interface with said middle-level device drivers of said computer operating system of said host computer;
a set of controllers that direct said computer data storage devices to acquire or transmit data;
a set of cables that connect said host bus adapters to said controllers of said computer data storage devices; and
a set of buses that connect said controllers to said computer data storage devices and allow said computer data storage devices to acquire or transmit data.

8. The system of claim 7 wherein said set of cables that connect said host bus adapters to said controllers of said computer data storage devices is electrical.

9. The system of claim 7 wherein said set of cables that connect said host bus adapters to said controllers of said computer data storage devices is fiber-channel.

10. A system that transmits computer data along more than one physical data path between a host computer and computer data storage devices comprising:
a means for transmitting commands from said host computer through a computer operating system to said computer data storage devices using multiple paths;
a means for connecting said computer operating system through host bus adapters to said computer data storage devices comprised of arrays of computer hard disks;
a means for directing said host bus adapters with host bus adapter drivers;
a means for utilizing multiple paths for data flow between said host computer and said computer data storage devices by intercepting device commands from said computer operating system, replacing commands of said computer operating system with commands of a multiple-path driver and sending said commands of said multiple-path driver to a virtual host bus adapter driver such that said computer data storage devices are selectively presented to said computer operating system of said host computer as a single virtual computer storage device, said multiple-path driver functioning without affecting said computer operating system operation and said multiple-path driver being provided without modifying said computer operating system source code;

a means for inserting a portion of said multiple-path driver between said middle-level device drivers of said computer operating system of said computer and said host bus adapter drivers of said computer operating system of said host computer;

a means for inserting an additional portion of said multiple-path driver into said upper-level device drivers of said computer operating system of said computer to interface with said middle-level device drivers of said computer operating system of said host computer;

a controller means for directing said computer data storage devices to acquire or transmit data;

a means for connecting said host bus adapters to said computer data storage devices; and a means for connecting said controller means to said computer data storage devices and allowing said computer data storage devices to acquire or transmit data.

* * * * *